United States Patent [19]
Irvine

[11] 3,851,179
[45] Nov. 26, 1974

[54] SHIPPING CASK NEUTRON AND HEAT SHIELD

[75] Inventor: Alvin R. Irvine, Knoxville, Tenn.

[73] Assignee: The United States of America as represented by the United States Atomic Energy Commission, Washington, D.C.

[22] Filed: Feb. 5, 1974

[21] Appl. No.: 439,794

[52] U.S. Cl................. 250/506, 250/515, 250/518
[51] Int. Cl............................................. G21f 5/00
[58] Field of Search .......... 250/428, 432, 506, 507, 250/515, 518

[56] References Cited
UNITED STATES PATENTS
3,005,105  10/1961  Lusk .................................. 250/506
3,414,727  12/1968  Bonilla.............................. 250/506
3,727,060  4/1973   Blum................................. 250/506

Primary Examiner—Archie R. Borchelt
Assistant Examiner—Davis L. Willis
Attorney, Agent, or Firm—John A. Horan; David S. Zachry; Louis M. Deckelmann

[57] ABSTRACT

This invention provides for a shield for radioactive materials shipping containers or casks to shield external heat generated by accidental fire from the contents and to shield the external environment of the cask from escape of neutrons generated by the contents. The shield is a multiplicity of metal-clad, metal-housed slabs or beads comprising a lithium hydroxide and sodium hydroxide mixture. Neutron shielding is provided by the relatively favorable neutron shielding properties of the component elements. Heat absorption from an external source is retarded by multiple effects. In the original metal-clad solid state, the hydroxide mixture does not contact the outer metal housing thus minimizing conduction, it cannot transfer heat by convection, and it provides a heat sink by means of heat of fusion at a suitably low temperature. Once the hydroxide is molten and expanded, these conditions are all countered providing a path for release of internally generated heat.

7 Claims, 2 Drawing Figures

3,851,179

SHIPPING CASK NEUTRON AND HEAT SHIELD

BACKGROUND OF THE INVENTION

This invention was made in the course of, or under, a contract with the United States Atomic Energy Commission.

Standards for design, fabrication, and inspection of irradiated fuel shipping containers have been established. The criteria include structural integrity, materials of construction, fabrication techniques, nuclear safety, radiation shielding, quality assurance, and heat transfer. Shipment of large quantities of spent reactor fuel and similar materials requires the use of a special neutron shield to reduce the neutron field to specified intensities. Similarly, provision must be made for maintaining the shipping system temperature within acceptable limits to prevent failure of the containment system and the escape of radioactive contents. Shipments of spent reactor fuel, which contain large amounts of radioactive fission products, will generate substantial amounts of heat. Therefore, the materials in the heat flow path from the cask to the atmosphere must not severely retard heat flow if excessive temperatures are to be avoided.

Water is an excellent neutron shield and is used on some LWR shipping casks currently being designed. Its primary disadvantage for use in an LMFBR spent fuel shipping cask is that, should the water shield be lost, along with any primary heat transfer system designed to keep the cask cool under normal conditions, then all decay heat would have to be dissipated across the now empty neutron shield. The empty cavity would offer substantial resistance to heat flow and would result in undesirably high temperatures in the fuel. Another undesirable characteristic is that the water, if it were to remain in place, could rapidly convect heat from the outer surface to the gamma shield during an external fire. In an accidental fire, large quantities of heat could be added to the cask contents from the outside It would be desirable and there exists a need, therefore, to provide shielding to minimize external heat absorption from a fire, and to permit the discharge of internally generated heat when the cask approaches the maximum acceptable temperature. The present invention was conceived to meet this need in a manner to be described hereinbelow.

SUMMARY OF THE INVENTION

It is the object of the present invention to provide a shield for radioactive materials shipping casks to shield external heat generated by accidental fire from the contents and to shield the external environment of the cask from escape of neutrons generated by the contents.

The above object has been accomplished in the present invention by providing a shipping cask in which an encompassing gamma shield has welded thereto an external radially extending fin network with an external housing in welded attachment with the outer extremity of the fin network, and providing neutron shielding elements comprising metal clad solid lithium and sodium hydroxide formed to shape and size to fit within the fin network compartments with an evacuated clearance space to prevent formation of significant thermal conduction and convection bridges under normal conditions between the gamma shield and the outer metal housing, but to provide thermal conducting bridges therebetween under high temperature expanded conditions.

DESCRIPTION OF THE PREFERRED EMBODIMENT

Figure 1:
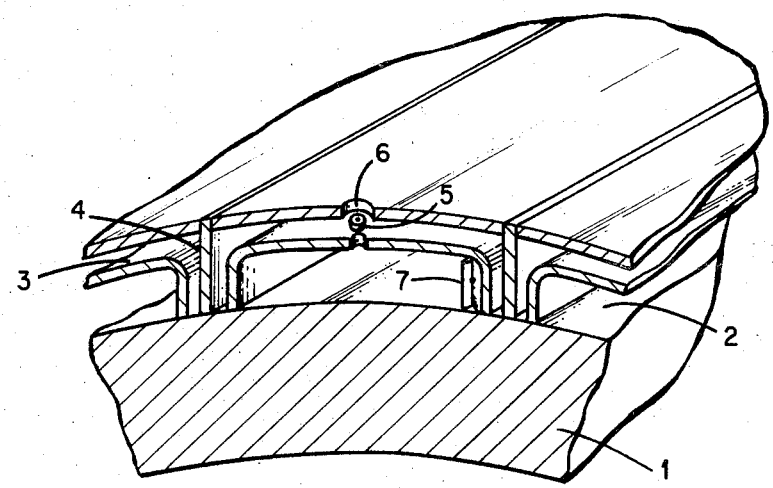
FIG. 1 is a cut-away view of a wall of the shipping cask of the present invention.

FIG. 1 is a cut-away view of a cylindrical wall of the shipping cask of the present invention. It should be understood that the complete cask includes a bottom unit attached to the cylindrical portion of the cask and a lid portion adapted for sealing the contents of the cask, with the bottom unit and lid portion both provided with a gamma shield and neutron shield in the same general structural arrangement as illustrated in FIG. 1. The shipping cask may be constructed, for example, in a manner similar to that shown in FIG. 2 of U.S. Pat. No. 3,414,727, issued Dec. 3, 1968, except the neutron shield is modified in accordance with the present invention.

With specific reference to FIG. 1, a gamma shield 1 is positioned between the interior of the shipping cask and a neutron shield assembly mounted on the exterior of the gamma shield. The gamma shield 1 may be carbon steel, for example. The neutron shield assembly comprises a plurality of closed chambers 4 which include a plurality of radially or outwardly extending fins which are closed by means of a plurality of cover plates welded thereto, the cover plates serving as the external walls of the shipping cask's cylindrical, bottom, and lid portions thereof. Mounted within each of the chambers 4 is a neutron shield housing 3 constructed from a metal, and housing a mixture of sodium hydroxide and lithium hydroxide, for example.

Mounted within each of the housings 3 is at least one self-inflating bellows unit 7. It can be seen that there is a space between each of the housings 3 and each of the enclosing chambers 4. Each of the cover plates of the chambers 4 is provided with an evacuation port 6 which is adapted to be closed by means of a suitable plug, not shown. In line with each of the ports 6 is a fill hole in each of the housings 3 which is sealed by means of a respective fusible fill plug 5. Each of the housings 3 defines a chamber 2 which is almost filled with a mixture of sodium hydroxide and lithium hydroxide. After each chamber 2 is substantially filled with the above mixture by means of the respective housing 3 fill hole and the respective port 6, then the air contained within the respective void spaces of the housings 3 and the chambers 4 is evacuated. The housings 3 are then closed by affixing respective plugs 5, and chambers 4 are closed while evacuated by respective, suitable closure plugs, not shown.

The opposing surfaces of each of the chambers 4 and the housings 3 are highly polished to produced low emission and absorption coefficients for thermal radiation; the evacuated space therebetween negates conductive and convective heat transport. It should be noted that the shipping cask with which the above shielding means is utilized is also provided with a circulating primary cooling system, not shown, for removing a normal radioactive decay heat load in a conventional manner.

A typical composition of the neutron shield which is placed within each of the spaces 2 of the housings 3 is 73 mole percent sodium hydroxide and 27 mole percent lithium hydroxide, and may be poured into the housings 3 in the form of small beads. Alternatively, the neutron shielding units may be prepared in the form of blocks or slabs cast from a melt. In this case, the slabs are positioned within the respective housings 3 during assembly of the neutron shielding network. Other lithium - to - sodium hydroxide ratios could be used to promote increased neutron shielding or to achieve a higher melting point.

Expansion of the respective collapsed metal bellows 7 is caused by containment therewithin of a capsule containing a volatile fluid, the capsule having a seal fusible at a predetermined temperature. The fusible plugs 5 in the inner housings 3 and the inflating bellows capsule fusible seals are designed to lose their integrity at approximately 650°F., for example, or at another desired temperature, thus permitting the molten hydroxide mixture to expand into the vacuum gaps between the housings 3 and the chambers 4 thereby closing these gaps at sustained elevated temperatures.

Figure 2:
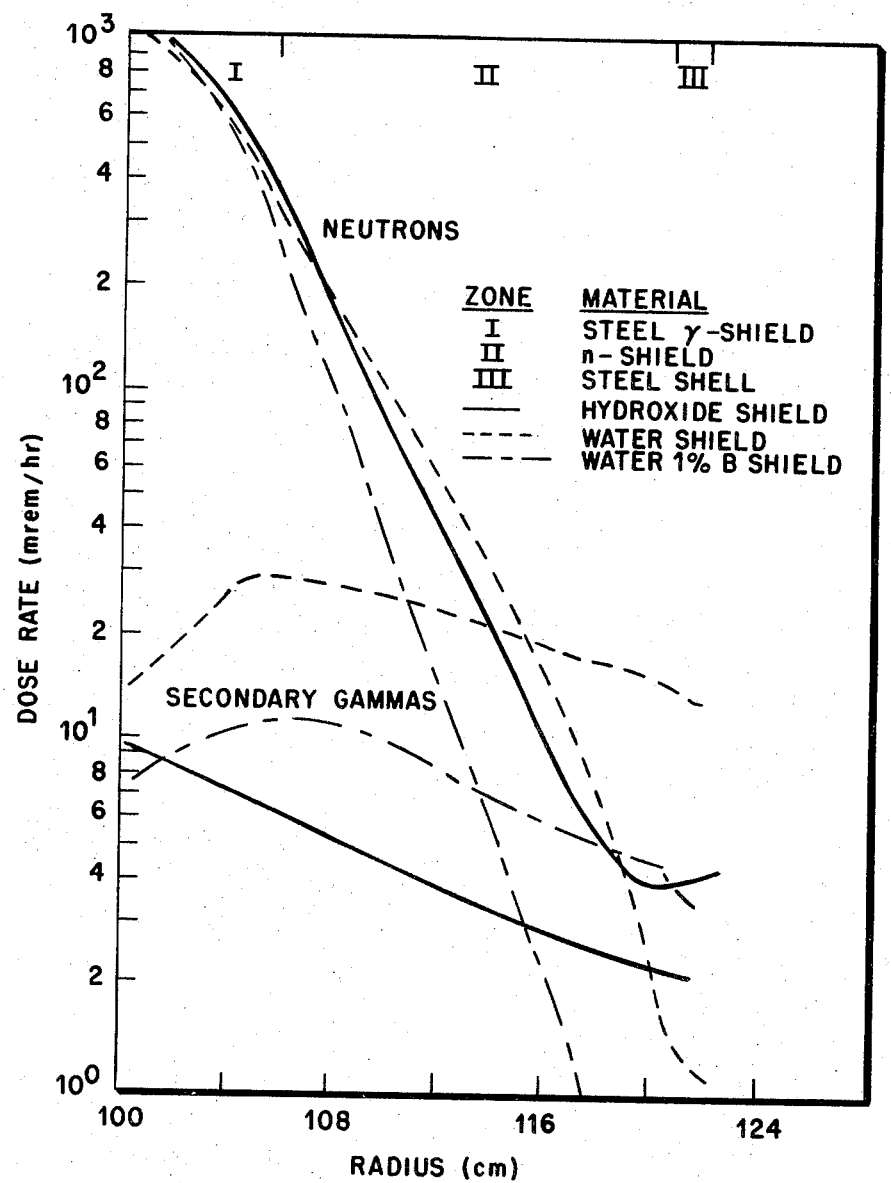
FIG. 2 is a graph showing a comparison of three neutron shielding materials for reducing neutron-derived ionizing radiation dose rate in the device of FIG. 1.

FIG. 2 illustrates a comparison of three neutron shielding materials for reducing neutron-derived ionizing radiation dose rate for a shipping cask such as described above with a similar thickness of water as is used for the hydroxide mixture for reducing the total dose rate. Thus, FIG. 2 presents the neutron dose at the outer edge of the carbon steel gamma shield, through a 6-inch-thick neutron shield, and at the outer steel shell of the device of FIG. 1. With a eutectic mixture of NaOH-LiOH as the neutron shield, the surface dose rate from neutrons is calculated to be 3.75 mrem/hr, which is about a factor of three higher than if water were used as the neutron shield. Adding 1 percent boron to the water would reduce the neutron dose rate to about 0.5 mrem/hr on the surface. However, the dose rate from the secondary gammas produced in the water shield is about 13 mrem/hr, almost a factor of seven larger than that produced in the hydroxide mixture. The secondary gammas developed in the borated water produce a surface dose rate of about 3.5 mrem/hr. The low yield of secondary gammas in the hydroxide mixture stems from the presence of relatively high concentrations of lithium, which has a high thermal neutron cross section (70 barns) and produces little resultant penetrating radiation when neutrons are absorbed. Consequently, the sum of the dose rate contributions from neutrons plus secondary gammas produced in the hydroxide shield is almost a factor of three less than that produced in the water but about 30 percent more than that produced in the borated water. The summed dose rate from the hydroxide mixture is sufficiently low such that, even when added to the dose rate produced by primary gammas, it meets the Department of Transportation requirement of a maximum of 10 mrem/hr at 6 feet from the surface of the transporting vehicle.

It should be noted that the neutron shield of the shipping cask of the present invention, as described hereinabove, has a small neutron leakage path that extends through the steel fins surrounding the hydroxide mixture. However, its effect on the average neutron field can be made quite small by ensuring that the cross-sectional area of the leakage path is less than 5 percent of the total area.

When the above-described shipping cask is being utilized to transport spent reactor fuel and when the primary cooling system fails, and/or a fire occurs, transfer of externally generated heat to the cask is retarded by the above-mentioned polished surfaces which limit heat transfer by radiation, by the presence of only a small sectional area of steel (for example, low conductivity stainless) for a conduction path, and by the evacuated space between the neutron shielding elements and the external cover plates and fins, thus substantially preventing conduction and convection across these pathways. However, in the case of extended primary cooling system failure and a rise of temperature of the neutron shielding elements, melting and expansion of the hydroxide mixtures occur and, when the fusible plugs 5 and the bellows fusible seals are melted effecting an expansion of the bellows 7, then the molten hydroxide mixture will fill the vacuum gaps within the respective chambers 4 thus forming heat-conducting bridges to the cover plates.

When the melting temperature (426°F. for the eutectic mixture) of the hydroxide is reached, a heat sink is provided by the heat of fusion of the hydroxide. When melting and expansion occurs, heat transfer to the cover plates is greatly enhanced by convection within the liquid hydroxide melts. The solid hydroxide mixtures are not subject to leakage or evaporation as are liquids and the vapor pressure is low, even at elevated temperatures, making containment under high-temperature conditions relatively simple. The eutectic mixture is almost as effective in shielding neutrons as is borated water when compared on a volumetric basis.

It has been determined that a steel-shielded shipping cask equipped with the present invention can withstand an external 1,475°F. fire for more than 10 hours before melting of all of the hydroxide mixtures would occur.

This invention has been described by way of illustration rather than by limitation and it should be apparent that it is equally applicable in fields other than those described.

What is claimed is:

1. An improved shipping container for radioactive materials comprising a gamma shield encompassing said materials within said container, a radially extending fin network in welded attachment with and external to said gamma shield, a plurality of cover plates in welded attachment with the outer extremities of said fin network to thus provide a plurality of closed chambers, said cover plates forming the external housing of said container, a plurality of respective neutron shield housings positioned within respective ones of said chambers and defining a respective air space therebetween, and respective neutron shielding materials positioned within and substantially filling respective ones of said neutron shield housings, said shielding materials comprising a mixture of lithium hydroxide and sodium hydroxide, each of said shield housings provided with a fusible plug in one wall thereof, and each of said closed chambers provided with an evacuation port, said ports adapted to be sealed after evacuation of each of said respective air spaces, whereby said evacuated air spaces serve to prevent formation of significant thermal conduction bridges under normal temperature conditions between said gamma shield and said respective chamber cover plates but to provide thermal conducting bridges therebetween under a sustained high temperature expansion of said respective mixtures into said respective air spaces.

2. The shipping container set forth in claim 1, wherein the opposing faces of said respective chambers and said respective shield housings are highly polished.

3. The shipping container set forth in claim 2, wherein each of said neutron shield housings is fabricated from metal.

4. The shipping container set forth in claim 2, wherein said neutron shielding materials consist of 73 mole percent sodium hydroxide and 27 mole percent lithium hydroxide.

5. The shipping container set forth in claim 4, and further including at least one self-inflating bellows positioned within each respective neutron shield housing, each of said bellows containing therewithin a capsule provided with a fusible seal and containing a volatile fluid.

6. The shipping container set forth in claim 5, wherein said shield housings fusible plugs and said capsules fusible seals are adapted to melt at 650°F.

7. The shipping container set forth in claim 6, wherein said gamma shield is carbon steel.

\* \* \* \* \*